(12) United States Patent
Oh et al.

(10) Patent No.: US 12,524,834 B2
(45) Date of Patent: Jan. 13, 2026

(54) IMAGE RESTORING CIRCUIT USING NEURAL NETWORK AND IMAGE RESTORING METHOD USING THE CIRCUIT

(71) Applicants: SK hynix Inc., Icheon-si (KR); Seoul National University R&DB Foundation, Seoul (KR)

(72) Inventors: Youngjin Oh, Seoul (KR); Guyong Park, Seoul (KR); Haesoo Chung, Seongnam-si (KR); Nam Ik Cho, Seoul (KR)

(73) Assignees: SK hynix Inc., Icheon-si (KR); Seoul National University R&DB Foundation, Seoul (KR)

( * ) Notice: Subject to any disclaimer, the term of this patent is extended or adjusted under 35 U.S.C. 154(b) by 282 days.

(21) Appl. No.: 18/530,079

(22) Filed: Dec. 5, 2023

(65) Prior Publication Data

US 2025/0124546 A1    Apr. 17, 2025

(30) Foreign Application Priority Data

Oct. 16, 2023    (KR) .................. 10-2023-0137622

(51) Int. Cl.
*G06T 5/10*    (2006.01)
(52) U.S. Cl.
CPC ...... *G06T 5/10* (2013.01); *G06T 2207/20084* (2013.01)
(58) Field of Classification Search
CPC ............ G06T 5/10; G06T 2207/20084; G06T 2207/10024; G06T 2207/20081;
(Continued)

(56) References Cited

U.S. PATENT DOCUMENTS

| 2018/0176578 A1* | 6/2018 | Rippel | G06N 3/04 |
| 2023/0142467 A1* | 5/2023 | Kaplanyan | G06T 15/60 |
| | | | 345/592 |
| 2025/0124301 A1* | 4/2025 | Habibian | G06T 11/00 |

FOREIGN PATENT DOCUMENTS

| KR | 10-2089151 B1 | 3/2020 |
| KR | 10-2022-0028962 A | 3/2022 |

(Continued)

OTHER PUBLICATIONS

Syed Waqas Zamir et al., "Restormer: Efficient Transformer for High-Resolution Image Restoration," 2022 IEEE/CVF Conference on Computer Vision and Pattern Recognition (CVPR), 2022, pp. 5728-5739.

(Continued)

*Primary Examiner* — Juan M Guillermety

(57) ABSTRACT

An image restoring circuit includes a first restoring circuit including a first encoder and a first decoder, and configured to generate a first output image and first tensor data by restoring an input image; a second restoring circuit including a second encoder and a second decoder, and configured to restore the input image by using an output of the first encoder, an output of the first decoder, and the first tensor data to thereby generate a second output image; and a coupling circuit configured to generate second tensor data based on the output of the first encoder and the output of the first decoder and provide the second tensor data to the second encoder.

20 Claims, 6 Drawing Sheets

(58) Field of Classification Search
CPC .. G06T 5/50; G06T 5/60; G06T 9/002; G06T 2207/20056; G06N 3/0455
See application file for complete search history.

(56) References Cited

FOREIGN PATENT DOCUMENTS

| KR | 10-2022-0097818 A | 7/2022 | |
|---|---|---|---|
| KR | 10-2554665 B1 | 7/2023 | |
| WO | WO-2022239671 A1 * | 11/2022 | ............... G06T 7/00 |

OTHER PUBLICATIONS

Yuqian Zhou et al., "Image restoration for under-display camera," IEEE/CVF Conference on Computer Vision and Pattern Recognition, 2021, pp. 9179-9188.
Prof. Dr.-Ing. G. Wenke, "Organic light emitting diode (OLED)," Research gate, 2016.
Kinam Kwon et al., "Controllable image restoration for under-display camera in smartphones," IEEE/CVF Conference on Computer Vision and Pattern Recognition, 2021, pp. 2073-2082.
Ruicheng Feng et al., "Removing diffraction image artifacts in under-display camera via dynamic skip connection network," IEEE/CVF Conference on Computer Vision and Pattern Recognition, 2021, pp. 662-671.
Jaihyun Koh et al., "Bnudc: A two-branched deep neural network for restoring images from under-display cameras," IEEE/CVF Conference on Computer Vision and Pattern Recognition, 2022, pp. 1950-1959.
Kai Zhang et al., "Beyond a gaussian denoiser: Residual learning of deep CNN for image denoising," IEEE transactions on image processing, 2017, pp. 3142-3155, vol. 26, No. 7.
Jiaming Liu et al., "Learning raw image denoising with bayer pattern unification and bayer preserving augmentation," IEEE/CVF Conference on Computer Vision and Pattern Recognition Workshops, 2019.
Shi Guo et al., "Toward convolutional blind denoising of real photographs," IEEE/CVF Conference on Computer Vision and Pattern Recognition, 2019, pp. 1712-1722.
Yoonsik Kim et al., "Transfer learning from synthetic to real-noise denoising with adaptive instance normalization," IEEE/CVF Conference on Computer Vision and Pattern Recognition, 2020, pp. 3482-3492.
Syed Waqas Zamir et al., "Cycleisp: Real image restoration via improved data synthesis," IEEE/CVF Conference on Computer Vision and Pattern Recognition, 2020, pp. 2696-2705.
Seungjun Nah et al., "Deep multi-scale convolutional neural network for dynamic scene deblurring," IEEE conference on computer vision and pattern recognition, 2017, pp. 3883-3891.
Sung-Jin Cho et al., "Rethinking coarse-to-fine approach in single image deblurring," IEEE/CVF international conference on computer vision, 2021, pp. 4641-4650.
Bee Lim et al., "Enhanced deep residual networks for single image super-resolution," IEEE conference on computer vision and pattern recognition workshops, 2017, pp. 136-144.
Yulun Zhang et al., "Residual dense net-work for image super-resolution," IEEE conference on computer vision and pattern recognition, 2018, pp. 2472-2481.
Yulun Zhang et al., "Image super-resolution using very deep residual channel attention networks, " European conference on computer vision (ECCV), 2018.
Jae Woong Soh et al., "Natural and realistic single image super-resolution with explicit natural manifold discrimination," IEEE/CVF Conference on Computer Vision and Pattern Recognition, 2019, pp. 8122-8131.
Jinjin Gu et al., "Blind super-resolution with iterative kernel correction," IEEE/CVF Conference on Computer Vision and Pattern Recognition, 2019, pp. 1604-1613.
Andreas Lugmayr et al., "NTIRE 2020 challenge on real-world image super-resolution: Methods and results," IEEE/CVF Conference on Computer Vision and Pattern Recognition Workshops, 2020.
Codruta O. Ancuti et al., "Ntire 2020 challenge on nonhomogeneous dehazing," IEEE/CVF Conference on Computer Vision and Pattern Recognition Workshops, 2020.
Haiyan Wu et al., "Contrastive learning for compact single image dehazing," IEEE/CVF Conference on Computer Vision and Pattern Recognition, 2021, pp. 10551-10560.
Chen Chen et al., "Learning to see in the dark," IEEE Conference on Computer Vision and Pattern Recognition, 2018, pp. 3291-3300.
Haesoo Chung et al., "Kernel prediction network for detail-preserving high dynamic range imaging," 2019 Asia-Pacific Signal and Information Processing Association Annual Summit and Conference (APSIPA ASC), 2019, pp. 1589-1594.
Sang-Hoon Lee et al., "Exposure-structure blending network for high dynamic range imaging of dynamic scenes," IEEE Access, 2020, pp. 117428-117438, vol. 8.
Jae Woong Soh et al., "Joint high dynamic range imaging and super-resolution from a single image," IEEE Access, 2019, pp. 177427-177437, vol. 7.
Syed Waqas Zamir et al., "Learning enriched features for real image restoration and enhancement," European Conference on Computer Vision, 2020, arXiv:2003.06792v2.
Liangyu Chen et al., "Hinet: Half instance normalization network for image restoration," IEEE/CVF Conference on Computer Vision and Pattern Recognition, 2021.
Syed Waqas Zamir et al., "Multi-stage progressive image restoration," IEEE/CVF conference on computer vision and pattern recognition, 2021, pp. 14821-14831.
Zhengzhong Tu et al., "Maxim: Multi-axis MLP for image processing," IEEE/CVF Conference on Computer Vision and Pattern Recognition, 2022, pp. 5769-5780.
Yuqian Zhou et al., "UDC 2020 challenge on image restoration of under-display camera: Methods and results," European Conference on Computer Vision, 2020, arXiv:2008.07742v1.
Youngjin Oh et al., "Residual dilated U-net with spatially adaptive normalization for the restoration of under display camera images," 2021 Asia-Pacific Signal and Information Processing Association Annual Summit and Conference (APSIPA ASC), 2021, pp. 151-157.
Taesung Park et al., "Semantic image synthesis with spatially-adaptive Normalization," IEEE/CVF Conference on Computer Vision and Pattern Recognition, 2019, pp. 2337-2346.
Jifeng Dai et al., "Deformable convolutional networks," IEEE international conference on computer vision, 2017, pp. 764-773.
Xizhou Zhu et al. "Deformable convnets v2: More deformable better results", IEEE/CVF conference on computer vision and pattern recognition, 2019, pp. 9308-9316.
Wenbin Zou et al., "Sdwnet: A straight dilated network with wavelet transformation for image deblurring," IEEE/CVF International Conference on Computer Vision, 2021, pp. 1895-1904.
Xintian Mao et al., "Deep residual fourier transformation for single image deblurring," 2021, arXiv:2111.11745v1.
Liming Jiang et al., "Focal frequency loss for image reconstruction and synthesis," IEEE/CVF International Conference on Computer Vision, 2021, pp. 13919-13929.
Olaf Ronneberger et al., "U-net: Convolutional networks for biomedical image segmentation," International Conference on Medical image computing and computer-assisted intervention, 2015, arXiv:1505.04597v1.
Fisher Yu et al., "Multi-scale context aggregation by dilated convolutions," ICLR, 2016, arXiv:1511.07122v3.
Pierre Charbonnier et al., "Two deterministic half-quadratic regularization algorithms for computed imaging," IEEE, 1994, pp. 168-172.
Ilya Loshchilov et al., "SGDR: Stochastic gradient descent with warm restarts," 2017, arXiv:1608.03983v5.

* cited by examiner

IMAGE RESTORING CIRCUIT USING NEURAL NETWORK AND IMAGE RESTORING METHOD USING THE CIRCUIT

CROSS-REFERENCE TO RELATED APPLICATION

The present application claims priority under 35 U.S.C. § 119(a) to Korean Patent Application No. 10-2023-0137622, filed on Oct. 16, 2023, which is incorporated herein by reference in its entirety.

BACKGROUND

1. Technical Field

Various embodiments generally relate to an image restoring circuit that restores an image using a neural network and an image restoring method using the circuit.

2. Related Art

When capturing an image using an under display camera (UDC) concealed beneath a display of a smartphone, light scattering and attenuation may occur as the light traverses display circuits.

As a result, the captured image exhibits intricate issues such as blurring, color shifting, reduced light intensity, and flare. In particular, these issues manifest a broad area of the image and display spatially variable characteristics contingent upon the angle of incident light.

Conventionally, techniques for image restoration tailored to address specific damages, such as noise removal, blur correction, etc., have been available.

However, the conventional technology faces limitations in simultaneously restoring images that encompass diverse types of damage, such as images captured with an UDC.

SUMMARY

In accordance with an embodiment of the present disclosure, an image restoring device may include a first restoring circuit including a first encoder, and a first decoder and configured to generate a first output image and first tensor data by restoring an input image; a second restoring circuit including a second encoder and a second decoder, and configured to restore the input image by using an output of the first encoder, an output of the first decoder, and the first tensor data to thereby generate a second output image; and a coupling circuit configured to generate second tensor data based on the output of the first encoder and the output of the first decoder and provide the second tensor data to the second encoder.

In accordance with an embodiment of the present disclosure, an image restoring method may include performing a first restoration operation to generate a first output image and first tensor data by applying an input image to a first encoder and a first decoder; performing a coupling operation on an output of the first encoder and an output of the first decoder, thereby generating second tensor data; and performing a second restoration operation to generate the second output image by applying data, which is generated based on the input image and the first tensor data, and the second tensor data to a second encoder and a second decoder.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate various embodiments, and explain various principles and advantages of those embodiments.

DETAILED DESCRIPTION

The following detailed description references the accompanying figures in describing illustrative embodiments consistent with this disclosure. The embodiments are provided for illustrative purposes and are not exhaustive. Additional embodiments not explicitly illustrated or described are possible. Further, modifications can be made to presented embodiments within the scope of teachings of the present disclosure. The detailed description is not meant to limit this disclosure. Rather, the scope of the present disclosure is defined in accordance with claims and equivalents thereof. Also, throughout the specification, reference to "an embodiment" or the like is not necessarily to only one embodiment, and different references to any such phrase are not necessarily to the same embodiment(s).

In the following disclosure, a circuit is an element that performs a neural network operation, and may be referred to as a neural network circuit.

Part or all of the circuit may be implemented through hardware, software, or a combination thereof.

For example, when a neural network circuit is implemented using software, lower level components that constitute the neural network circuit may be implemented through one or more functions.

A lower level component of the neural network circuit may be referred to as a layer, a block, a module, a neural network layer, a neural network block, or the like.

Hereinafter, data input to or output from each lower level component of the neural network circuit may be referred to as a tensor or tensor data.

Figure 1:
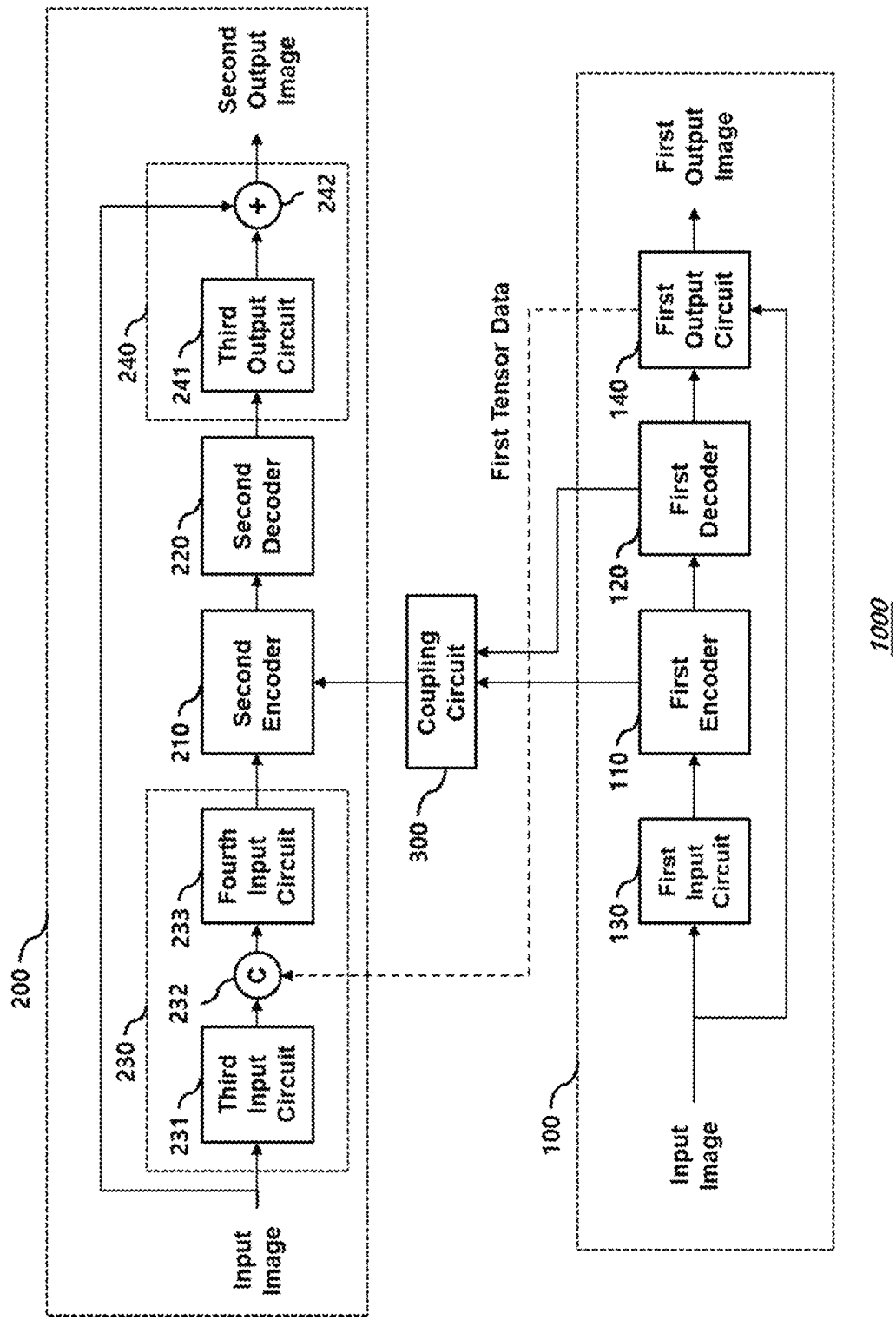
FIG. 1 illustrates an image restoring device according to an embodiment of the present disclosure.

FIG. 1 illustrates an image restoring circuit 1000 according to an embodiment of the present disclosure. The image restoring circuit 1000 may restore an image using a neural network.

Referring to FIG. 1, the image restoring circuit 1000 includes a first restoring circuit 100, a second restoring circuit 200, and a coupling circuit 300. The first restoring circuit 100 and the second restoring circuit 200 are connected through the coupling circuit 300.

The first restoring circuit 100 restores an input image to generate a first output image, and the second restoring circuit 200 restores the input image to generate a second output image.

The first restoring circuit 100 includes a first encoder 110 and a first decoder 120. The first decoder 120 decodes an output of the first encoder 110.

The first restoring circuit 100 further includes a first input circuit 130 and a first output circuit 140. The first input circuit 130 extracts first feature data from the input image and provides the first feature data to the first encoder 110, and the first output circuit 140 generates the first output image based on an output of the first decoder 120 and the input image.

In this embodiment, the first input circuit 130 generates tensor data by sequentially performing a convolution operation and a channel attention operation on the input image, and transmits the tensor data to the first encoder 110. The first feature data extracted from the input image may correspond to the tensor data generated by the first input circuit 130.

Since the convolution operation and the channel attention operation themselves are well known, detailed descriptions thereof will be omitted. Additionally, types of operations performed by the first input circuit 130 are not limited thereto.

After that, the first encoder 110 encodes the tensor data from the first input circuit 130, and the first decoder 120 decodes encoded tensor data output from the first encoder 110.

The first output circuit 140 performs a supervised attention operation on decoded tensor data, output from the first decoder 120, and the input image to thereby generate the first output image and first tensor data. The first tensor data is transmitted to the second restoring circuit 200.

The first tensor data serves as an additional input to the second restoring circuit 200 and corresponds to an attention map generated through the supervised attention operation.

The first output image is an image primarily restored by the first restoring circuit 100 and is used during a neural network learning operation.

Since the supervised attention operation itself is well known, detailed description thereof will be omitted. Additionally, types of operations performed by the first output circuit 140 are not limited thereto.

The second restoring circuit 200 includes a second encoder 210 and a second decoder 220. The second decoder 220 decodes an output of the second encoder 210.

The second restoring circuit 200 further includes a second input circuit 230, which extracts second feature data from the input image and the first tensor data and provides the second feature data to the second encoder 210, and a second output circuit 240, which generates the second output image based on an output from the second decoder 220 and the input image.

In this embodiment, the second input circuit 230 includes a third input circuit 231, which sequentially performs a convolution operation and a channel attention operation on the input image to extract third feature data from the input image, a concatenation circuit 232, which concatenates the first tensor data with the third feature data output from the third input circuit 231, and a fourth input circuit 233, which performs a convolution operation on an output of the concatenation circuit 232.

However, types of operations performed by the third input circuit 231 and the fourth input circuit 233 are not limited thereto.

The output of the fourth input circuit 233 is provided to the second encoder 210.

The second encoder 210 performs an encoding operation on tensor data input thereto, and the second decoder 220 decodes encoded tensor data output from the second encoder 210.

In addition, the second output circuit 240 includes a third output circuit 241, which performs a convolution operation on the decoded tensor data output from the second decoder 220, and an addition circuit 242, which adds an output of the third output circuit 241 and the input image to thereby generate the second output image.

However, types of operations performed by the third output circuit 241 are not limited thereto.

In this embodiment, the coupling circuit 300 provides the encoded tensor data output from the first encoder 110 and the decoded tensor data output from the first decoder 120 to the second encoder 210. The second encoder 210 performs the encoding operation on the tensor data output from the coupling circuit 300 and the tensor data output from the second input circuit 230, and provides the encoded tensor data generated by the encoding operation to the second decoder 220.

The second output image output from the second restoring circuit 200 serves as a final restored image generated by the image restoring circuit 1000 during an inference operation, and is referred to as a first restored image.

Figure 2:
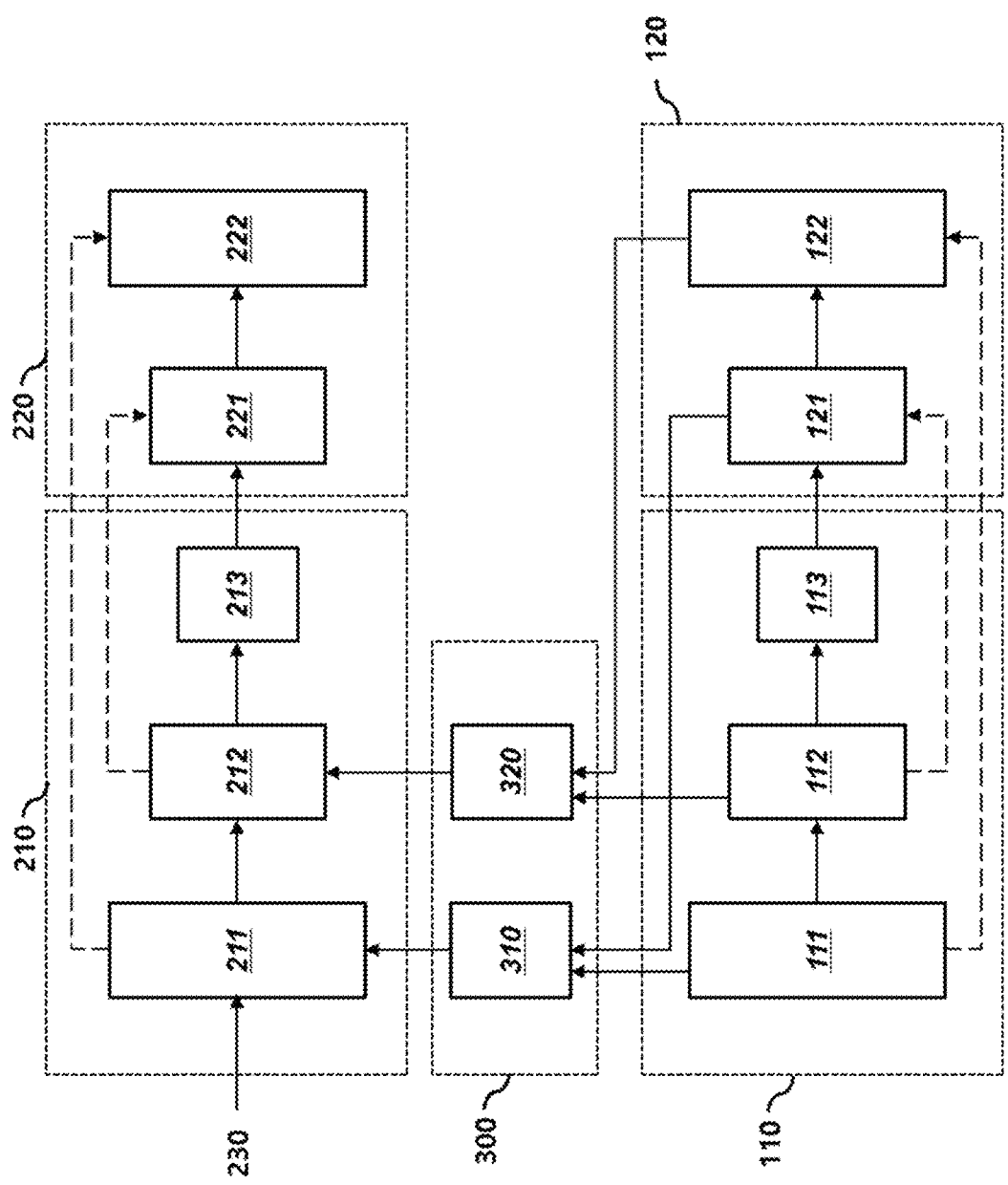
FIG. 2 illustrates an encoder, a decoder, and a coupling circuit according to an embodiment of the present disclosure.

FIG. 2 shows detailed configurations of the first encoder 110, the second encoder 210, the first decoder 120, the second decoder 220, and the coupling circuit 300 of FIG. 1 according to an embodiment of the present disclosure.

Referring to FIG. 2, the first encoder 110 includes (N+1) first sub-encoders, e.g., three first sub-encoders 111, 112, and 113, that are connected sequentially, and the first decoder 120 includes N first sub-decoders, e.g., two first sub-decoders 121 and 122, that are connected sequentially. N is a natural number.

The two first sub-encoders 111 and 112 sequentially decrease dimensions of an input tensor, and the two first sub-decoders 121 and 122 sequentially increase dimensions of an input tensor correspondingly. In the third first sub-encoder 113, dimensions of input and output tensors remain the same.

Additionally, in this embodiment, the second encoder 210 includes (N+1) second sub-encoders, e.g., three sequentially connected second sub-encoders 211, 212, and 213, and the second decoder 220 includes N second sub-decoders, e.g., two sequentially connected second sub-encoders 221 and 222.

The two second sub-encoders 211 and 212 sequentially decrease dimensions of an input tensor, and the two second sub-decoders 221 and 222 sequentially increase dimensions of an input tensor correspondingly. In the third second sub-encoder 213, dimensions of input and output tensors remain the same.

The structure of a neural network, which includes a plurality of sub-encoders connected sequentially within an encoder and similarly includes a plurality of sub-decoders connected sequentially within a decoder, is well known. The number of sub-encoders and the number of sub-decoders may be variously determined according to embodiments.

The coupling circuit 300 includes N sub-coupling circuits, e.g., two sub-coupling circuits 310 and 320 respectively corresponding to the two second sub-encoders 211 and 212.

In this embodiment, the first sub-coupling circuit 310 performs a convolution operation on each of an output tensor of the first first sub-encoder 111 and an output tensor of the first first sub-decoder 121, and adds results of the convolution operations. Then, a result of the addition is provided as an input to the first second sub-encoder 211.

The first second sub-encoder 211 performs an encoding operation using tensor data output from the second input circuit 230, and adds a result of the encoding operation and an output of the first sub-coupling circuit 310.

The second sub-coupling circuit 320 performs a convolution operation on each of an output tensor of the second first sub-encoder 112 and an output tensor of the second first sub-decoder 122, and adds results of the convolution operations. Then, a result of the addition is provided as an input to the second second sub-encoder 212.

The second second sub-encoder 212 performs an encoding operation using tensor data output from the first second sub-encoder 211, and adds a result of the encoding operation and an output of the second sub-coupling circuit 320.

The third second sub-encoder 213 performs an encoding operation using tensor data output from the second second sub-encoder 212.

The arrow indicated by a dotted line in FIG. 2 represents a skip connection, which will be described in detail below.

Figure 3:
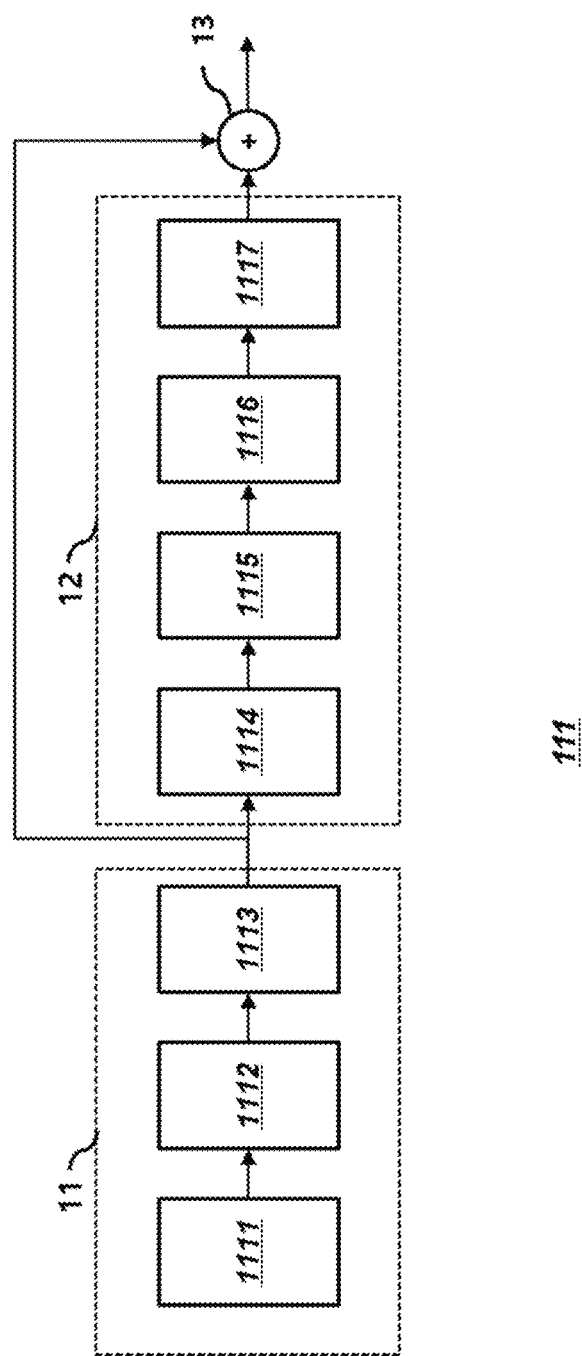
FIG. 3 illustrates a first sub-encoder according to an embodiment of the present disclosure.

FIG. 3 illustrates the first sub-encoder 111 of FIG. 2 according to an embodiment of the present disclosure.

The basic structure of the first sub-encoder 111 shown in FIG. 3 can be applied as is to the other first sub-encoders and the second sub-encoders, and can be adjusted in response to dimensional changes in the corresponding input/output tensor.

The first sub-encoder 111 includes a first encoding layer 11 that encodes an input tensor, a second encoding layer 12 that encodes an output tensor of the first encoding layer 11, and an addition circuit 13 that adds the output tensor of the first encoding layer 11 and an output tensor of the second encoding layer 12.

The first encoding layer 11 includes a first deformable convolution circuit 1111, an activation operation circuit 1112, and a second deformable convolution circuit 1113 that are connected sequentially.

The first deformable convolution circuit 1111 has a well-known form whose filter is modified from that of a typical convolution circuit. For example, unlike the typical convolution circuit that uses a regular square-shaped filter, each element of the filter used in the first deformable convolution circuit 1111 is arranged irregularly.

The second encoding layer 12 includes a first convolution circuit 1114, an activation operation circuit 1115, a second convolution circuit 1116, and an attention circuit 1117 that are connected sequentially.

In this embodiment, the activation operation circuits 1112 and 1115 perform rectified linear unit (ReLU) operations.

Figure 4:
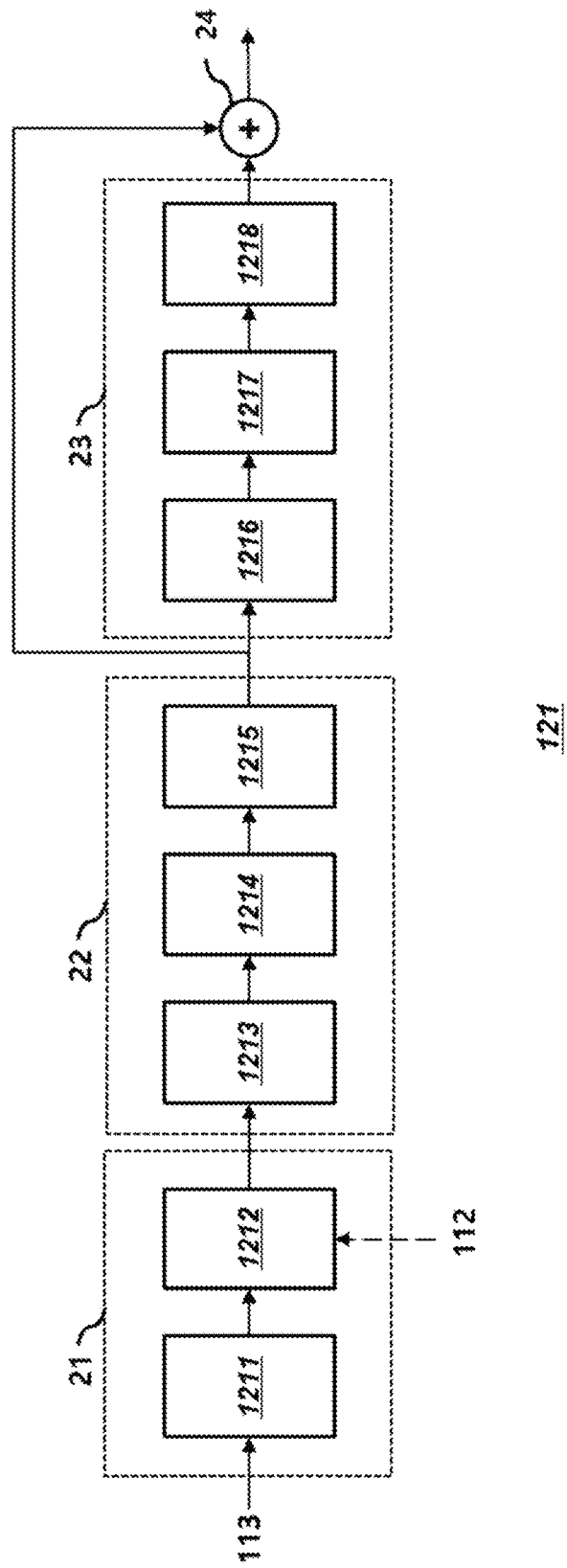
FIG. 4 illustrates a first sub-decoder according to an embodiment of the present disclosure.

FIG. 4 illustrates the first sub-decoder 121 of FIG. 2 according to an embodiment of the present disclosure.

The basic structure of the first sub-decoder 121 shown in FIG. 4 can be applied as is to the other first sub-decoders and the second sub-decoders, and can be adjusted in response to changes in the dimension of the corresponding input/output tensor.

The first sub-decoder 121 includes a first decoding layer 21 for decoding an input tensor, a second decoding layer 22 for decoding an output tensor of the first decoding layer 21, and a third decoding layer 23 for decoding an output tensor of the second decoding layer 22, and an addition circuit 24 for adding the output tensor of the second decoding layer 22 and an output tensor of the third decoding layer 23.

The first decoding layer 21 includes a transposed convolution circuit 1211 and a skip connection circuit 1212 that are connected sequentially.

The skip connection circuit 1212 concatenates an output of the transposed convolution circuit 1211 and an output of a corresponding encoder. At this time, the output provided from the corresponding encoder is referred to as a skip connection output.

In FIG. 2, skip connections are indicated by dotted arrows. The encoder corresponding to the first first sub-decoder 121 is the second first sub-encoder 112, and the encoder corresponding to the second first sub-decoder 122 is the first first sub-encoder 111.

A first tensor input to the first first sub-decoder 121 from the third first sub-encoder 113 and a second tensor input to the first first sub-decoder 121 from the second first sub-encoder 112 through a skip connection may have different dimensions, preventing concatenation operations thereof.

Therefore, the transposed convolution circuit 1211 performs a transposed convolution operation on the first tensor input from the third first sub-encoder 113, aligning dimensions of the first tensor with those of the second tensor input from the second first sub-encoder 112. This adjustment enables the concatenation operation to take place.

The second decoding layer 22 includes a first convolution circuit 1213, a first activation operation circuit 1214, and a second convolution circuit 1215 that are connected sequentially.

The third decoding layer 23 includes a third convolution circuit 1216, a second activation operation circuit 1217, and a third convolution circuit 1218 that are connected sequentially.

In this embodiment, the first and second activation operation circuits 1214 and 1217 perform ReLU operations.

Figure 5:
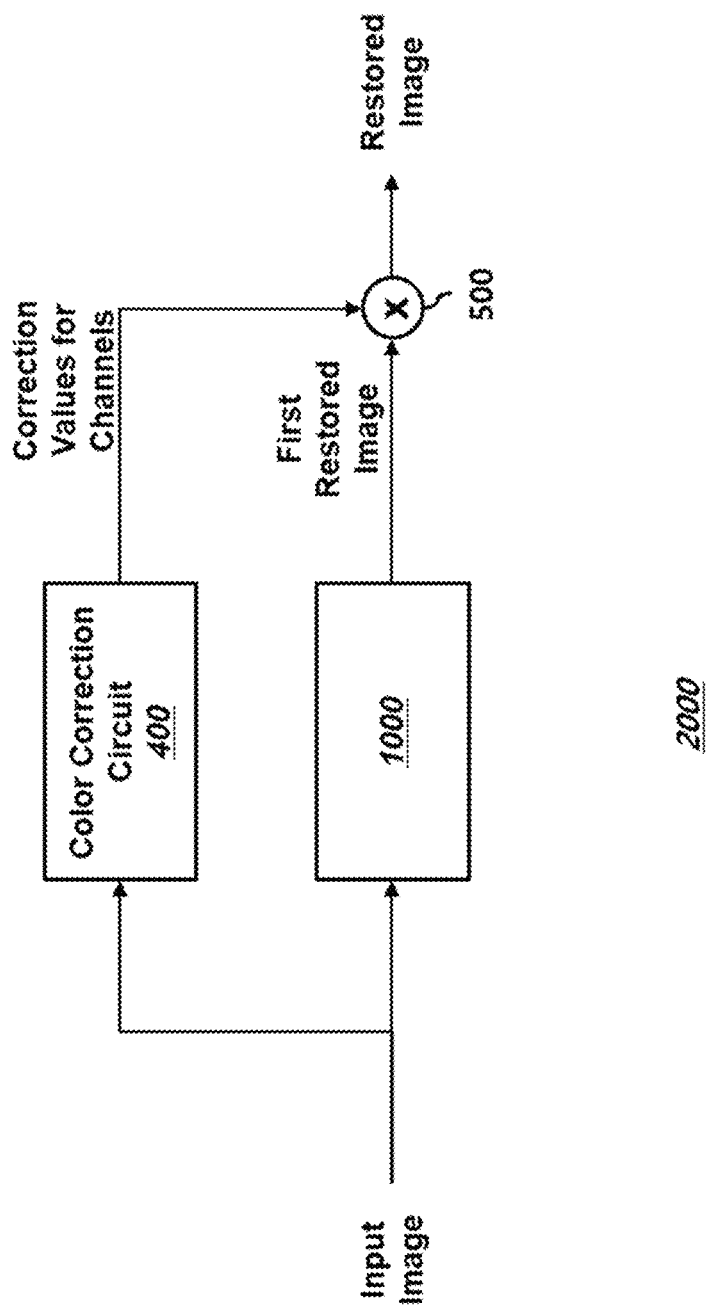
FIG. 5 illustrates an image restoring circuit according to another embodiment of the present disclosure.

FIG. 5 illustrates an image restoring circuit 2000 according to another embodiment of the present disclosure.

The image restoring circuit 2000 is an extension of the image restoring circuit 1000 illustrated in FIG. 1, and further includes a color correction circuit 400 and a multiplication circuit 500.

As described above with reference to FIG. 1, the image restoring circuit 1000 of FIG. 1 generates the first restored image that corresponds to the second output image output from the second restoring circuit 200.

The color correction circuit 400 generates correction values for individual channels of an input image. For example, if there are three channels R, G, and B in the input image, three scalar correction values are respectively corresponding to the three channels are generated.

The multiplication circuit 500 generates a restored image by multiplying each channel of the first restored image with a corresponding correction value generated by the color correction circuit 400.

Figure 6:
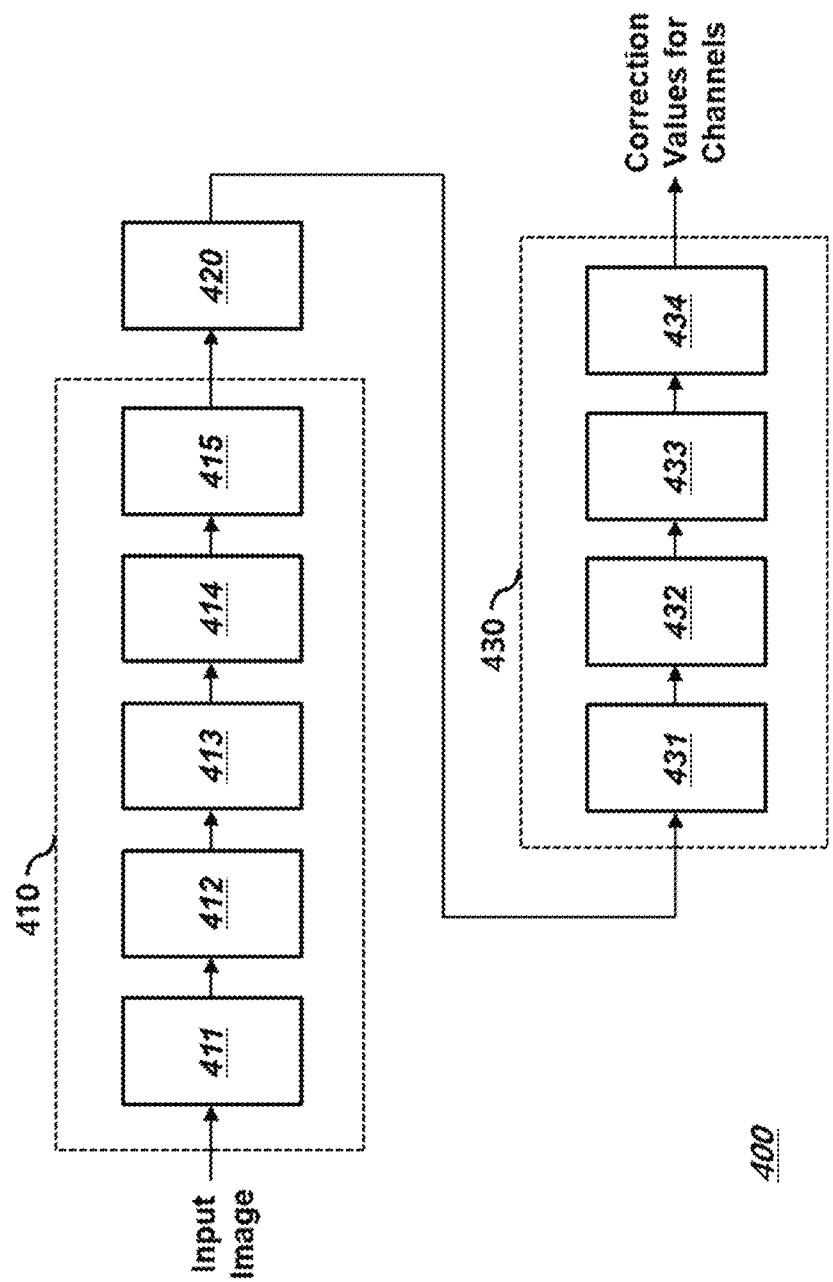
FIG. 6 illustrates a color correction circuit according to an embodiment of the present disclosure.

FIG. 6 illustrates the color correction circuit 400 of FIG. 5 according to an embodiment of the present disclosure.

The color correction circuit 400 includes a feature extraction circuit 410 that extracts feature data from the input image, a pooling circuit 420 that performs a pooling operation on an output of the feature extraction circuit 410, and a correction value generation circuit 430 that performs neural network calculations on an output of the pooling circuit 420 and outputs the correction values for the channels of the input image.

The feature extraction circuit 410 includes a first convolution circuit 411, a first residual circuit 412, a second convolution circuit 413, a second residual circuit 414, and a third convolution circuit 415 that are connected sequentially.

Since the convolution circuit and the residual circuit themselves are well known, detailed descriptions thereof will be omitted.

In this embodiment, the pooling circuit 420 performs a global average pooling (GAP) operation to generate one scalar correction value for each channel.

The correction value output circuit 430 includes a first fully connected circuit 431, a first activation operation circuit 432, a second fully connected circuit 433, and a second activation operation circuit 434.

In this embodiment, the first activation operation circuit 432 performs a ReLU operation, and the second activation operation circuit 434 performs a sigmoid operation.

Hereinafter, a learning method for an image restoring circuit will be described.

Learning data includes an input image captured by a UDC, featuring damages with RGB channels, alongside a corresponding true value image. The true value image may correspond to an input image included in a data set.

In this embodiment, all coefficients of the neural network circuits constituting the image restoring circuits 1000 or 2000 are learned simultaneously during a learning process.

Total loss function L used in the learning process is represented by Equation 1.

$$L = \sum_{k=1}^{k=2}[L_1(X_k, x) + \alpha L_2(X_k, x) + \beta L_3(X_k, x)] \quad \text{[Equation 1]}$$

In Equation 1, x represents the true value image corresponding to the input image, and $X_k$ represents a k-th output image that is generated by the image restoring circuit and corresponds to the input image. Therefore, $X_1$ represents a first output image, and $X_2$ represents a second output image.

In Equation 1, α is set to 0.9, and β is set to 0.999, but their values are not limited thereto.

In Equation 1, $L_1$ is a first loss function expressed as Equation 2, and $L_2$ is a second loss function expressed as Equation 3.

$$L_1 = \sqrt{\|X_k - x\|^2 + \epsilon^2} \quad \text{[Equation 2]}$$

The first loss function $L_1$ corresponds to a distance between the first output image $X_1$ or the second output image $X_2$ corresponding to the input image and the true value image x. In Equation 2, ε is an exceedingly small value set to $10^{-8}$ in this embodiment, but its value is not limited thereto.

$$L_2 = \sqrt{\|\Delta(X_k) - \Delta(x)\|^2 + \epsilon^2} \quad \text{[Equation 3]}$$

In Equation 3, Δ represents the Laplace operator, and when the Laplace operator is applied to an image, edges included in the image can be detected.

That is, the second loss function $L_2$ corresponds to a distance between the edge of the first or second output image $X_1$ or $X_2$ corresponding to the input image and the edge of the true value image x.

In this embodiment, a third loss function $L_3$ is additionally used to consider loss in the frequency domain. The third loss function $L_3$ is represented by Equation 4.

$$L_3 = \|F(X_k) - F(x)\| \quad \text{[Equation 4]}$$

In Equation 4, F represents the Fourier transform. Accordingly, $F(X_k)$ represents the Fourier transform of the first output image $X_1$ or the second output image $X_2$, and F(x) represents the Fourier transform of the true value image x, and the third loss function $L_3$ corresponds to a distance between $F(X_k)$ and F(x).

Table 1 shows the effect of the present invention compared to prior arts.

TABLE 1

| Neural Network | PSNR | SSIM |
| --- | --- | --- |
| Prior Art 1 1(U-Net) | 40.71 | 0.9910 |
| Prior Art 2(DISCNet) | 43.27 | 0.9827 |
| Present Embodiment | 45.99 | 0.9958 |

Prior art 1 corresponds to the case of restoring a damaged image using a U-Net neural network, and prior art 2 corresponds to the case of restoring a damaged image using a DISCNet neural network.

Peak Signal-to-Noise Ratio (PSNR) and Structural Similarity Index Map (SSIM) are individual indicators used to measure image quality. In both PSNR and SSIM metrics, a higher value corresponds to superior image quality.

Table 1 shows values measured based on the true value image and the restored image obtained through the neural network. As shown in the Table 1, the present embodiment shows the highest values for both indicators.

As described above, in this embodiment, a deformable convolution circuit is implemented within an encoder circuit, and the third loss function $L_3$ representing the loss in the frequency domain is considered during the learning process.

Table 2 shows the enhancement in performance achieved through the utilization of the deformable convolution circuit and the incorporation of the third loss function $L_3$, as implemented in this embodiment.

TABLE 2

| Comparative example | PSNR | SSIM |
| --- | --- | --- |
| #1 | 44.02 | 0.9945 |
| #2 | 44.40 | 0.9945 |
| #3 | 45.13 | 0.9957 |
| #4 | 45.99 | 0.9958 |

Comparative example #1 corresponds to a case in which the encoder circuit uses a general convolution circuit instead of the deformable convolution circuit, and the learning is performed using a loss function that does not include the third loss function $L_3$.

Comparative example #2 corresponds to a case of implementing the deformable convolution circuit in the encoder circuit of the comparative example #1.

Comparative example #3 corresponds to a case where the learning is performed using a loss function including the third loss function $L_3$ in the comparative example #1.

Comparative example #4 corresponds to a case where the learning is performed by implementing the deformable convolution circuit in the encoder circuit and incorporating the loss function including the third loss function $L_3$, as implemented in the present embodiment.

From Table 2, it can be seen that employing either the deformable convolution circuit or integrating the third loss function $L_3$ during the learning process enhances performance compared to the comparative example #1. Notably, the combined application of both techniques in this embodiment demonstrates the most substantial improvement in performance.

Although various embodiments have been illustrated and described, various changes and modifications may be made to the described embodiments without departing from the spirit and scope of the invention as defined by the following claims.

What is claimed is:

1. An image restoring circuit comprising:
   a first restoring circuit including a first encoder and a first decoder, and configured to generate a first output image and first tensor data by restoring an input image;
   a second restoring circuit including a second encoder and a second decoder, and configured to restore the input image by using an output of the first encoder, an output of the first decoder, and the first tensor data to thereby generate a second output image; and
   a coupling circuit configured to generate second tensor data based on the output of the first encoder and the output of the first decoder and provide the second tensor data to the second encoder.

2. The image restoring circuit of claim 1, wherein the first restoring circuit further comprises:
   a first input circuit configured to extract first feature data from the input image and provide the first feature data to the first encoder; and
   a first output circuit configured to generate the first output image and the first tensor data based on the output of the first decoder and the input image.

3. The image restoring circuit of claim 2, wherein the second restoring circuit further comprises:
   a second input circuit configured to extract second feature data from the input image and the first tensor data and provide the second feature data to the second encoder; and
   a second output circuit configured to generate the second output image based on an output of the second decoder and the input image.

4. The image restoring circuit of claim 3, wherein the second input circuit includes:
   a third input circuit configured to extract the first feature data from the input image;
   a concatenation circuit configured to concatenate the first feature data and the first tensor data; and
   a fourth input circuit configured to process an output of the concatenation circuit and provide its output to the second encoder.

5. The image restoring circuit of claim 3, wherein the second output circuit includes:
   a third output circuit configured to process the output of the second decoder; and
   an addition circuit configured to generate the second output image by adding an output of the third output circuit and the input image.

6. The image restoring circuit of claim 1, wherein the first encoder includes (N+1) first sub-encoders that are connected sequentially,
   wherein the second decoder includes N first sub-decoders that are connected sequentially,
   wherein the second encoder includes (N+1) second sub-encoders that are connected sequentially,
   wherein the second decoder includes N second sub-decoders that are connected sequentially, and
   wherein N is a natural number.

7. The image restoring circuit of claim 6, wherein the coupling circuit includes N sub-coupling circuits,
   wherein an i-th sub-coupling circuit processes an output of an i-th first sub-encoder and an output of an i-th first sub-decoder and provides processing results thereof to an i-th second sub-encoder, and
   wherein i is a natural number that is equal to or smaller than N.

8. The image restoring circuit of claim 1, wherein each of the first encoder and the second encoder includes an operation circuit that performs a deformable convolution operation.

9. The image restoring circuit of claim 1, further comprising:
   a color correction circuit configured to generate scalar correction values for respective channels of the input image; and
   a multiplication circuit configured to generate a restored image by multiplying the scalar correction values with respective channels of the second output image.

10. The image restoring circuit of claim 9, wherein the color correction circuit includes:
    a feature extraction circuit configured to extract features from the input image;
    a pooling circuit configured to perform a global average pooling operation on the features output from the feature extraction circuit; and
    a correction value generation circuit configured to generate the scalar correction values for the respective channels of the input image using an output of the pooling circuit.

11. An image restoring method comprising:
    performing a first restoration operation to generate a first output image and first tensor data by applying an input image to a first encoder and a first decoder;
    performing a coupling operation on an output of the first encoder and an output of the first decoder, thereby generating second tensor data; and
    performing a second restoration operation to generate the second output image by applying data, which is generated based on the input image and the first tensor data, and the second tensor data to a second encoder and a second decoder.

12. The image restoring method of claim 11, wherein performing the first restoration operation includes:
    performing a first input operation to extract first feature data from the input image and provide the first feature data to the first encoder; and
    performing a first output operation to generate the first output image and the first tensor data by processing the output of the first decoder and the input image.

13. The image restoring method of claim 11, wherein performing the second restoration operation includes:
    performing a second input operation to extract second feature data from the input image and the first tensor data and provide the second feature data to the second encoder; and
    performing a second output operation to generate the second output image based on an output of the second decoder and the input image.

14. The image restoring method of claim 13, wherein performing the second input operation includes:
- performing a third input operation to extract first feature data from the input image;
- performing a concatenation operation to concatenate the first feature data and the first tensor data; and
- performing a fourth input operation to generate the second feature data using an output of the concatenation operation and provide the second feature data to the second encoder.

15. The image restoring method of claim 13, wherein performing the second output operation includes:
- performing a third output operation to process the output of the second decoder; and
- performing an addition operation to generate the second output image by adding an output of the third output operation and the input image.

16. The image restoring method of claim 11, wherein performing the first restoration operation includes performing a deformable convolution operation in the first encoder, or performing the second restoration operation includes performing a deformable convolution operation in the second encoder.

17. The image restoring method of claim 11, further comprising:
- performing a color correction operation to generate scalar correction values for respective channels of the input image; and
- multiplying the scalar correction values with the respective channels of the input image to generate a restored image.

18. The image restoring method of claim 17, wherein performing the color correction operation includes:
- extracting feature data from the input image;
- performing global average pooling operations on respective channels of the input image; and
- generating the scalar correction values for the respective channels from outputs of the global average pooling operations.

19. The image restoring method of claim 11, wherein the first restoring operation, the coupling operation, and the second restoring operation are performed by using a neural network circuit, and the image restoring method further comprises performing a learning operation for the neural network circuit,
- wherein performing the learning operation includes calculating a total loss function including a loss function in a frequency domain from a true value image corresponding to the input image, and
- wherein the first output image is generated by applying the input image to the neural network circuit, and the second output image is generated by applying the input image and the first output image to the neural network circuit.

20. The image restoring method of claim 19, wherein the loss function in the frequency domain corresponds to sum of a first difference between Fourier transforms of the input image and the first output image and a second difference between Fourier transforms of the input image and the second output image.

* * * * *